United States Patent [19]
Smith et al.

[11] Patent Number: 5,846,915
[45] Date of Patent: Dec. 8, 1998

[54] DELAYED BREAKING OF GELLED HYDROCARBON FRACTURING FLUID

[75] Inventors: Kevin W. Smith, McMurray; Todd R. Thomas, Coraopolis, both of Pa.

[73] Assignee: Clearwater, Inc., Pittsburgh, Pa.

[21] Appl. No.: 548,646

[22] Filed: Oct. 26, 1995

[51] Int. Cl.$^6$ .............................. C09K 3/00; E21B 43/17; B01D 17/00
[52] U.S. Cl. .................. 507/269; 507/277; 507/238; 507/906; 507/921; 507/922; 252/358; 166/300; 166/308
[58] Field of Search ................... 507/921, 922, 507/906, 269, 270, 277, 238; 252/358; 166/300, 308

[56] References Cited

U.S. PATENT DOCUMENTS

| | | | |
|---|---|---|---|
| 2,965,566 | 12/1960 | Hoeppel | 252/8.5 |
| 3,505,374 | 4/1970 | Monroe | 556/26 |
| 3,749,173 | 7/1973 | Hill et al. | 166/291 |
| 4,003,393 | 1/1977 | Jaggard et al. | 137/15 |
| 4,104,173 | 8/1978 | Gary et al. | 507/238 |
| 4,153,649 | 5/1979 | Griffin, Jr. | 260/950 |
| 4,174,283 | 11/1979 | Griffin, Jr. | 507/203 |
| 4,200,539 | 4/1980 | Burnham | 507/238 |
| 4,200,540 | 4/1980 | Burnham | 507/238 |
| 4,316,910 | 2/1982 | Burnham | 507/238 |
| 4,622,155 | 11/1986 | Harris et al. | 507/238 |
| 4,784,694 | 11/1988 | Lemanczyk et al. | 507/110 |
| 4,795,574 | 1/1989 | Syrinek et al. | 507/238 |
| 4,919,209 | 4/1990 | King | 166/300 |
| 4,969,526 | 11/1990 | Cawiezel | 166/300 |
| 5,271,464 | 12/1993 | McCabe | 166/295 |
| 5,417,287 | 5/1995 | Smith et al. | 166/308 |
| 5,649,596 | 7/1997 | Jones et al. | 166/300 |

OTHER PUBLICATIONS

Martin Marietta specification sheets for "MagChem 10", MagChem 20, MagChem 30, Magchem 35, MagChem 40, and MagChem 50.

*Primary Examiner*—Philip Tucker
*Attorney, Agent, or Firm*—William L. Krayer

[57] ABSTRACT

Hydrocarbon fracturing fluids are made by combining organic phosphate esters with polyvalent metal salts in hydrocarbon carriers to form gels; breaking of the gel is retarded or otherwise controlled over a wide range of water concentrations through the use of slowly soluble alkaline earth metal compounds, preferably hard burned magnesium oxide, which may be added along with the gel component.

30 Claims, No Drawings

DELAYED BREAKING OF GELLED HYDROCARBON FRACTURING FLUID

TECHNICAL FIELD

This invention relates to the use of hydrocarbon gels in formation fracturing and otherwise in the recovery of hydrocarbons from subterranean formations. In particular, hydrocarbon gels used in formation fracturing are made to include alkaline earth metal compounds which will dissolve slowly and propitiously under the influence of small amounts of water and ambient downhole temperatures. Suitably slowly soluble alkaline earth metal compounds, such as magnesium oxide, dolomite, and lime, are used; the preferred composition is hard burned magnesium oxide, i.e. magnesium oxide treated with heat to reduce its surface area and solution rate.

BACKGROUND OF THE INVENTION

Polyvalent metal salts of orthophosphate esters have been used for years to create high viscosity gels in hydrocarbons such as crude oil, kerosene, Diesel oil and the like which are then used in formation fracturing. The wellbore is cemented and fitted with a casing, the casing is perforated to permit a fracturing fluid to pass into the formation, and then the fracturing fluid, in this case the gelled hydrocarbon carrying a proppant, is forced into the casing under pressure great enough to cause fractures in the formation, thus providing fissures for the passage of the hydrocarbons to be recovered. Good descriptions of these processes, specifically utilizing aluminum salts of the orthophosphate esters, may be found in the following patents: Griffin U.S. Pat. No. 4,174,283, Burnham and Tiner U.S. Pat. No. 4,200,539, Burnham U.S. Pat. No. 4,200,540, Burnham U.S. Pat. No. 4,316,810, and Harris, Hottmeyer and Pauls U.S. Pat. No. 4,622,155. Fracturing processes utilizing iron compounds in combination with similar orthophosphate esters are described by Monroe in U.S. Pat. No. 3,505,374 and Smith and Persinski in U.S. Pat. No. 5,417,287.

The gelled, viscous hydrocarbon fracturing fluid is excellent for its ability to carry proppants and place them in the fissures created by the fracturing process, where the proppants remain during production procedures. Efficient production requires that the gel should be broken, i.e. the viscosity reduced so the hydrocarbons to be recovered can pass through the fissures with the proppants in place.

Little is said in the above cited patent literature about breaking the gel, although it is implicit in the chemical structure of the gelling agent that it is not characterized by a strong chemical bond. Typically, a strong base such as soda ash or sodium bicarbonate is added in solid form along with the gel components at the time of their addition to the hydrocarbon fracturing fluid. The caustic or other material does not act immediately to break the gel because of the normally very low water content in the fracturing fluid. Thus, the conventional system relies on low water content to delay dissolution of the caustic and to preserve the gel long enough to permit a good fracturing procedure; on the other hand, if there is not enough water contamination from the formation or elsewhere, a small amount of water, perhaps in the range of about 1000 ppm, is added to assure the ability of the caustic to neutralize the gel. Where the fracturing personnel can be certain there is less than 1000 ppm water available to the system, gel breaking can thus be controlled to some extent by controlling the water concentration, but all too frequently much higher concentrations of water enter the system from uncontrolled sources such as the fracturing fluid tanks, blender tubs, the fracturing fluid itself, "heels" in tanks, and unanticipated downwell sources. The higher concentrations of water cause the immediate distribution and activation of the caustic, exposing it to the polyvalent metal, thus neutralizing and breaking the gel prematurely. When the gel is broken before completion of the fracturing process, the fracturing process is ineffective; in particular, when the gel does not have the strength to carry the proppant, the proppant is poorly distributed.

Another difficultly controlled variable in the conventional hydrocarbon gel fracturing and gel breaking process is that the soda ash normally used in the process may contain a range of particle sizes including relatively large particles which can be ground in an attempt to control their size, but which in any event are further reduced in size to a relatively uncontrolled extent by attrition during the injection process, e.g. when passing through the pumps and traversing the well bore under great pressure and turbulence. The operator has little control of the size of the soda ash at the point of effect, and in fact normally has no way of monitoring it. It is not desirable to introduce very small pieces, since their high surface area renders them likely to dissolve completely on contact with water, resulting in premature destruction of the gel. Thus the surface area and dissolved concentration of the alkali metal hydroxides are variables which are extremely difficult for the operators to control.

Calcium hydroxide is mentioned as a gel breaker which "functions slowly" by Hill, Smith and Kucera in U.S. Pat. No. 3,749,173 (col 3, line 51), but this patent does not deal with fracturing and no guidance is given as to the delayed action required in a fracturing process.

There is thus a need for a method of avoiding premature gel breaking and for controlling the process of gel breaking of hydrocarbon fracturing fluids only to take place after the fracturing process is completed, regardless of the amount of water present.

SUMMARY OF THE INVENTION

In accordance with our invention, slowly soluble alkaline earth metal compounds are used as gel breakers in gelled hydrocarbon fracturing fluids. Because they are slowly soluble even at high downhole temperatures, their action is delayed even if the gelled hydrocarbon fluid is exposed to a large amount of water. Thus, even in the presence of unexpectedly high concentrations of water, our hydrocarbon gel fracturing fluids will not break prematurely.

While we may use natural magnesium and calcium compounds such as lime and dolomite, we prefer to use magnesium oxide which has been heat-treated to obtain a surface area of no more than about 5 $m^2/g$ and most preferably 0.3 to 0.8 $m^2/g$, as will be explained below. Further, we prefer magnesium compounds to calcium compounds because they are ultimately more soluble than the calcium compounds and less likely to generate pH's higher than about 9; they are thus less likely to cause scale.

DETAILED DESCRIPTION OF THE INVENTION

The invention includes methods and compositions for fracturing subterranean formations and preparing them for production through a well bore. The compositions are fracturing fluids comprising a liquid hydrocarbon carrier, a polyvalent metal salt of a phosphoric acid ester, a proppant, and a gel breaker. The methods include methods of fracturing formations using such compositions, and methods of breaking hydrocarbon gels.

The hydrocarbon carriers, or base fracturing fluids, are well known in the art and include crude oil, Diesel oil, various lubricating oils, kerosene, and the like. The purposes of the fracturing fluid are two-fold—upon injection under great pressure down the well bore and through perforations in the well casing, it fractures the formation, and it carries with it small particles of relatively hard or strong material such as sand to serve as a proppant to keep the fissures open after they are formed by fracturing. The function of carrying the proppant particularly has been found to be better performed if the hydrocarbon fluid is provided with a high viscosity, or gel. It will be understood throughout the present discussion that the proppant, which may be sand, glass beads, ground walnut shells, synthetic resin particles, or any small particulate capable of maintaining an effective fissure opening, may be present in our fracturing fluids/gels in amounts from a pound or less per gallon to several pounds, i.e. twenty or more pounds per gallon; the amount of proppant used is generally a matter of discretion for the operators.

Gelling components of our compositions are polyvalent metal salts of orthophosphate esters. These are preferably made at the wellhead site by adding the orthophosphate ester and a polyvalent metal salt (preferably an inorganic iron or aluminum salt) separately to the hydrocarbon fracturing fluid, as is known in the art. See the above cited Monroe et al, Griffith, Burnham et al, and Smith et al patents, which are incorporated herein by reference. As is also explained in the Harris et al U.S. Pat. No. 4,622,155 cited above and also incorporated herein by reference, the salts formed can be expressed:

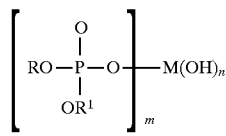

$$\left[ \begin{array}{c} O \\ \| \\ RO-P-O \\ | \\ OR^1 \end{array} \right]_m M(OH)_n \qquad I$$

where R is a straight or branched chain alkyl or an aryl, alkoxy or alkaryl group having about 6 to 18 carbon atoms and $R^1$ is hydrogen or aryl, alkaryl, alkyloxy, or alkyl group having up to about 18 carbon atoms, M is a polyvalent metal selected from aluminum and iron, m is a number from 1 to 3, n is 0–2, and the sum of m and n is 3. More generally, the iron or aluminum phosphate esters we use may be described as iron or aluminum salts of phosphate ester gelling agents having about 6 to about 36 carbon atoms (where the enumeration of the carbon atoms is based on a single phosphate ester moiety, bearing in mind that where m is 2 or 3, the total number of carbon atoms may be higher than 36).

As is known in the art, where M is aluminum, it is commonly introduced by way of a basic aluminum compound such as sodium aluminate, aluminum isopropoxide or hydrated aluminate. As reviewed in Burnham's U.S. Pat. No. 4,316,810 (col 5, lines 52–60), a preferred ultimate source of aluminum is sodium aluminate, which is added together with sodium hydroxide to an appropriate phosphate ester. In the case of an iron salt, ferric sulfate is preferred, as described in the above cited Smith and Persinski patent. In either case, the iron or aluminum salt can be added at the wellhead more or less at the same time as the phosphate ester.

The phosphate esters are, in turn, prepared by the known reaction of a phosphorous compound such as phosphorous pentoxide with an alcohol having the desired alkyl or other groups defined by R and $R_1$ as recited in the above formula I. Such reactions may result in mixtures of phosphate esters having different carbon-containing constituents. Mixtures of alcohols may of course be used to react with the phosphorous pentoxide or other suitable phosphorous compound. When the sodium aluminate or other aluminum compound is reacted with the phosphate ester, a mixture of aluminum phosphate ester salts will follow. Such mixtures are usable in our invention as are mixtures of iron phosphate ester salts. We may use any of the conventional polyvalent metal salts of phosphate esters which have been commonly used in the art of gelling hydrocarbon fracturing fluids. As noted by McCabe in U.S. Pat. No. 5,271,464 (col 2, lines 21–34)), the phosphate ester to be reacted with a polyvalent metal salt to form a gel has the general formula

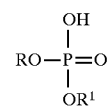

$$\begin{array}{c} OH \\ | \\ RO-P=O \\ | \\ OR^1 \end{array}$$

where R and $R^1$ are as defined above.

Our preferred gel breaker is a hard burned magnesium oxide of a particle size which will pass through a 200 mesh Tyler screen, having a surface area of less than 5 square meters per gram, preferably 0.3 to 0.8 $m^2/g$, and an ignition loss no greater than 0.5%. Commercially available hard burned magnesium oxide is generally made from magnesium hydroxide which is first heated to about 350° C. to dehydrate it. The magnesium hydroxide is in turn commonly made from natural sources such as dolomitic lime, which is treated to separate calcium chloride from magnesium hydroxide.

By hard burned, we mean that it is heated or calcined at temperatures of about 1100 to 1300° C. to obtain the desired surface area. The manufacturer's reported ignition loss is generally inversely related to the activity index used by manufacturers. See, for example, the specification sheets for MAGCHEM 10, MAGCHEM 20, MAGCHEM 30, MAGCHEM 35, MAGCHEM 40, and MAGCHEM 50 of Martin Marietta which are submitted with the Information Disclosure Statement for the present application. That is, the low loss on ignition is correlated to a high activity index, meaning the time required for reactivity is long. No activity index (which is a time measure of a phenolphthalein end point) is reported on the specification sheet for MAGCHEM 10 because it is quite long and difficult to measure; accordingly we have found we can correlate "slowly soluble" as applied to our preferred hard burned magnesium oxide to the loss on ignition and/or the surface area. Persons skilled in the art will recognize, however, that "slowly soluble" includes other alkaline earth metal breakers which have the desired effect of delayed breaking of the gels described herein. Even in cases where large amounts of water are present, the magnesium or other alkaline earth metal of our invention will not be immediately present for gel breaking prematurely in large quantities as is the case with sodium hydroxide. A suitable commercial material of our preferred type is technical grade magnesium oxide made by Martin Marietta and designated "MAGCHEM 10."

Other alkaline earth materials suitable for use in the invention include hard-burned dolomite, lime, dolomitic lime, and brucite having a solution rate in the same range as hard burned magnesium oxide. If a naturally occurring dolomite, lime or brucite does not have such a solution rate (most do not), heat treating or calcining may be employed to convert it to the appropriate physical properties, particularly a surface area of less than 5 $m^2/g$ and/or an ignition loss no greater than 0.5%. Temperatures for hard burning these materials may vary somewhat from those of hard-burned magnesium oxide—specifically, dolomitic limestone may be commercially calcined at 750°–850° C. and hard-burned at 900°–1200° C.; limestone may be calcined at 950°–1000° C. and hard-burned at 1000°–1300° C. We may refer to any such hard-burned alkaline earth metal compound (particularly oxide) which has a surface area less than 5 mg$^2$/g and/or an ignition loss no greater than 0.5% as controlled solution rate alkaline earth metal compounds or slowly soluble gel breakers useful in our invention.

The process of fracturing a well is carried out after the well has been fitted with a casing, cemented, and perforated as is known in the art. The gel breaker is added along with the phosphate ester and the polyvalent metal salt as described herein. No particular order of addition is necessary. Generally, the phosphate ester is added at concentrations of about 0.1 to about 1.2%, the aluminum or iron salt is added at concentrations of about 0.1 to about 1.2%, and the gel breaker is added at concentrations of two to about fifteen pounds of gel breaker per thousand gallons of fracturing fluid. Thus the phosphate ester salt which is formed by the phosphate ester and the metal salt together are added at concentrations of 0.2 to 2.4% of the fluid. Higher amounts may be used within the scope of our invention but normally the additional benefits may not be commensurate with the expense, and indeed too much gelling agent can have adverse side effects as is known in the art.

The efficiency of our invention is virtually independent of the amount of ambient water present in the wellbore and surrounding formation. Moreover, the amount of gel breaker in relation to the phosphate ester salt is not critical—an amount near the lower end of the range (say, two to five pounds of gel breaker per thousand gallons of fracturing fluid) will ultimately perform satisfactorily if not in optimum time. Amounts in excess of fifteen pounds per thousand gallons are generally superfluous unless high concentrations of gelling agents have been used, and will not adversely affect the process. While we prefer at least about 1000 ppm of water to be available for dissolution of the gel breaker, our invention obviates the problem of premature gel breaking under a wide range of conditions including lesser amounts of water. Even with amounts of water far in excess of 1000 ppm, the slowly soluble gel breakers we use will not immediately break the gel.

The following set of experiments illustrates the effectiveness of our invention.

EXAMPLE 1

300 ml of Diesel oil was placed in a Waring blender. Then 3 ml of a phosphate ester having 10–12 carbon atoms, the breaker (as shown in the table below), water, and 3 ml of a 20% solution of ferric sulfate were added. After addition of the breaker the mixture was blended for two minutes and placed in a roller oven at 150°–160° F. until the gel was broken as determined by visual observation.

| Breaker | % Water Added | Break Time |
| --- | --- | --- |
| 0.72g Na$_2$CO$_3$ | 0 | 5 hours |
| 0.72g Na$_2$CO$_3$ | 1 | 3 hours |
| 0.72g Na$_2$CO$_3$ | 2.5 | no gel |
| 0.72g Na$_2$CO$_3$ | 5 | no gel |
| 0.75 ml MgO | 0 | 4 hours |
| 0.75 ml MgO | 1 | 4 hours |
| 0.75 ml MgO | 2.5 | 4 hours |
| 0.75 ml MgO | 5 | 4 hours |

The magnesium oxide used was "MAGCHEM 10", a hard-burned magnesium oxide having a surface area of 0.3–0.8 m$^2$/g and a loss on ignition no more than 0.5%. It was used in the form of a slurry containing 8.8 pounds of "MAGCHEM 10" per gallon of butane Diesel oil; the slurry had a density of 14 pounds per gallon. As can be seen by the results, the alkali metal breaker, Na$_2$CO$_3$, is highly responsive to the amount of water present, while the action of the hard burned MgO breaker is substantially uniformly delayed and the delay is independent of the amount of water present. Thus my gel breaker may be said to be capable of controlling the desirable retardation of the gel breaking process.

EXAMPLE 2

Comparative Reaction/Solution Rates

The purpose of this experiment was to elicit accelerated reaction rates of various alkaline earth compounds under conditions otherwise more or less simulative of a downhole fracturing process employing a gelled hydrocarbon as a fracturing agent. As will be explained below, the time consumed for each experiment was a function of the solution rates of the candidates as well as their reaction rates—that is, all the candidates were introduced as solids; in order to change the pH of the mixture, the particles had to dissolve as well as react with the phosphoric acid to reach the desired pH end point. As previously explained, hydrocarbon gels are made with phosphoric acid esters and are viscosified by reaction with polyvalent metal salts. For the sake of accelerating the tests, however, only the hydrocarbon fluid and the phosphoric acid were used; the gelling agent was not formed. In addition, more water was present in the experiment than frequently will be the case in field conditions, in order to speed up the test.

The procedure was: 380 grams of Diesel fuel was placed in a beaker containing a 1000 rpm stirrer; the alkaline earth metal compound to be tested was added and dispersed by the electric stirrer at 1000 rpm for five minutes. A pH probe was then inserted, and 29.8 g of 1N phosphoric acid (387 g 85% H$_3$PO$_4$+ water→1000 ml) was added together with an additional 50 ml water. pH readings were begun immediately and continued until the pH in each case became 7.

Results were as follows:

| Alk Earth Material | Amt. | Time for pH7 (min.) |
| --- | --- | --- |
| Soda Ash (<20 mesh) | 13.78g | 3.8 |
| MagChem 50 lightburn | 5.20g | 9.4 |
| NaOH pellets ground <10 mesh | 10.40g | 13.9 |
| MagChem 125 lightburn | 5.20g | 28.1 |
| Chinese MgO | 5.20g | 43.3 |
| MagChem 20 | 5.20g | 60.1 |
| Dolime (as CaO) | 7.29g | 60.3 |
| Soda Ash (<10 mesh) | 13.78g | 72.6 |
| Mag Chem 10 | 5.20g | 154.4 |
| Hardburned Lime (as CaO) | 10.93g | 121.5 |
| Hardburned Dolime (as CaO) | 10.93g | 108.2 |

Notes: "Dolime" is dolomitic lime -- CaOMgO; "lightburn" means caustic calcined.

Under the conditions of the test, the hardburned lime and hardburned dolime appeared to require more than the molar equivalent of the other alkaline earth metal materials to perform in the test because of the difficulty of dispersion, yet, as may be seen from the results, more than 100 minutes was required for them to achieve the goal of neutralization. Thus, our alternative definition of slowly soluble for our purposes is that, under the conditions of the pH end point test described above, the material in question will require more than 100 minutes to achieve pH7. That is, our slowly soluble gel breakers are alkaline earth metal compounds, particularly oxides, which require more than 100 minutes to achieve a pH of 7 in the above test.

We claim:

1. Method of preparing a subterranean formation for hydrocarbon production comprising fracturing said formation with a gelled hydrocarbon fracturing fluid containing an iron or aluminum polyvalent metal salt of a phosphate ester having about 6 to about 36 carbon atoms and an amount of gel breaker effective to break said gelled hydrocarbon, said gel breaker comprising a slowly soluble alkaline earth metal compound having a surface area of less than 5 square meters per gram.

2. Method of claim 1 wherein said slowly soluble alkaline earth metal compound has a loss on ignition no greater than 0.5%.

3. Method of claim 1 wherein said slowly soluble alkaline earth metal compound is hard burned magnesium oxide.

4. Method of claim 1 wherein said polyvalent metal salt of a phosphate ester is made by reacting a phosphoric acid ester with an aluminum compound.

5. Method of claim 1 wherein said polyvalent metal salt of a phosphate ester is made by reacting a phosphoric acid ester with an iron compound.

6. Method of claim 1 wherein said polyvalent metal salt of a phosphate ester is present in said hydrocarbon fracturing fluid in concentrations of 0.2% to 2.4% by weight based on the hydrocarbon fluid.

7. Method of claim 1 wherein at least two pounds of gel breaker is present per thousand gallons of said fracturing fluid.

8. Method of claim 1 wherein said fracturing is performed in the presence of at least about 1000 ppm of water and wherein said gel breaker is dissolved in said water after said fracturing is substantially effected in an amount sufficient to break the gel of said gelled hydrocarbon.

9. Method of claim 3 wherein said hard burned magnesium oxide is present in amounts from 2 to about 15 pounds per thousand gallons of fracturing fluid.

10. Method of claim 3 wherein said hard burned magnesium oxide has a particle size such that it will pass through a 200 mesh sieve.

11. Method of claim 1 wherein said gel breaker is hard burned dolomite.

12. Method of claim 1 wherein said gel breaker is hardburned lime.

13. Method of making a fracturing fluid useful in subterranean formation fracturing comprising adding to a hydrocarbon fracturing fluid a phosphoric acid ester and at least a stoichiometric amount of a polyvalent metal source selected from iron salts and aluminum compounds in amounts effective to form a gel in said fracturing fluid, and also adding to said fracturing fluid a slowly soluble gel breaker having a loss on ignition no greater than 0.5% in an amount effective to break said gel.

14. Method of claim 13 wherein said phosphoric acid ester has about 6 to about 36 carbon atoms.

15. Method of claim 3 wherein said slowly soluble gel breaker is hard burned magnesium oxide.

16. Method of claim 13 wherein said slowly soluble gel breaker is hard:burned dolomitic lime.

17. Method of claim 13 wherein said slowly soluble gel breaker is hard burned lime.

18. Composition useful in formation fracturing comprising a hydrocarbon fracturing fluid, a gelling agent comprising a polyvalent metal salt of a phosphoric acid ester made from a phosphoric acid ester and an aluminum compound or iron salt, a proppant, and a slowly soluble alkaline earth metal gel breaker in an amount effective to break a gel formed by said gelling agent in said hydrocarbon fracturing fluid.

19. Composition of claim 18 wherein said gel breaker is hard burned magnesium oxide having a surface area of less than 5 square meters per gram.

20. Composition of claim 18 wherein said iron salt is ferric sulfate.

21. Composition of claim 18 wherein said gelling agent is present in an amount from about 0.2% to about 2.4% of the amount of fracturing fluid and said gel breaker is present in an amount from about 2 to about 15 pounds per thousand gallons of fracturing fluid.

22. Composition of claim 18 wherein said phosphoric acid ester has about 6 to about 36 carbon atoms.

23. Composition of claim 18 wherein said slowly soluble alkaline earth metal gel breaker requires at least 100 minutes to achieve a pH of 7 in 1N phosphoric acid mixed with Diesel fuel.

24. Method of delayed breaking a gelled hydrocarbon in contact with an uncontrolled amount of water, said gelled hydrocarbon comprising a hydrocarbon and a gelling agent which can be broken by alkaline earth metals, comprising adding to said gelled hydrocarbon an amount of a slowly soluble alkaline earth metal compound effective to break said gelled hydrocarbon in contact with said water.

25. Method of claim 24 wherein said gelling agent is an iron salt of a phosphate ester.

26. Method of claim 24 wherein said gelling agent is an aluminum salt of a phosphate ester.

27. Method of claim 24 wherein said gelled hydrocarbon is in contact with at least 1000 ppm of water.

28. Method of claim 24 wherein said slowly soluble alkaline earth metal compound is hard burned magnesium oxide.

29. A hydrocarbon gel exhibiting retardation in breaking comprising a hydrocarbon selected from the group consisting of crude oil, Diesel oil and kerosene, about 0.2% to about 2.4% (based on the hydrocarbon) of a polyvalent metal salt of a phosphate ester having about 6 to about 36 carbon atoms, in an amount sufficient to viscosity said hydrocarbon and about two pounds to about fifteen pounds of a hard burned alkaline earth metal oxide selected from the group consisting of hard burned magnesium oxide, hard burned lime, and hard burned dolomitic lime per thousand pounds of hydrocarbon.

30. Method of preparing a subterranean formation for production of hydrocarbons comprising fracturing said subterranean formation with a hydrocarbon gel of claim 29 wherein said hydrocarbon gel further comprises a proppant, under pressure and in an amount effective to fracture said formation, whereby the breaking of said hydrocarbon gel is retarded.

* * * * *